Inventor
SAMUEL S. MATTHES

Patented Apr. 2, 1940

2,195,734

UNITED STATES PATENT OFFICE 2,195,734

CONTACT DEVICE

Samuel S. Matthes, Mansfield, Ohio, assignor to The Ohio Brass Company, Mansfield, Ohio, a corporation of New Jersey Application September 24, 1938, Serial No. 231,538

7 Claims. (Cl. 246—254)

My invention relates to contact devices for the purpose of controlling the operation of electrical devices, such as electrically operated trolley switches, electrically operated track switches, signals and signal lights, when engaged by a current collector on a passing vehicle.

One object of my invention is to provide a simple light yet strong device and which is well protected from the weather.

Other objects will be apparent to those skilled in the art through the description of my invention which follows.

My invention resides in the new and novel construction, combination, and relation of the parts herein described and shown in the accompanying drawing.

Figure 1:
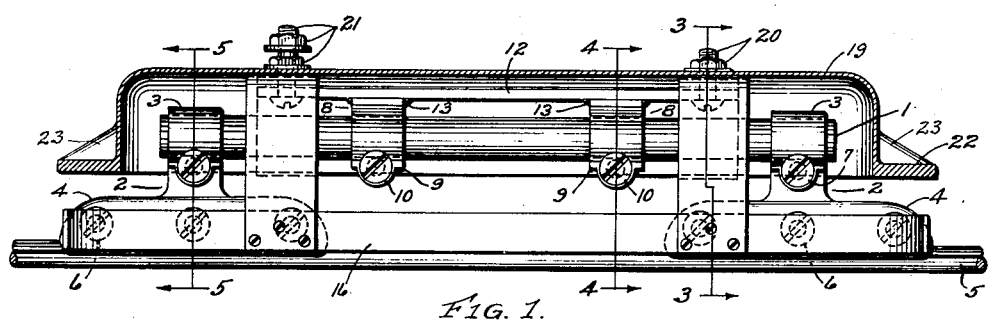
Fig. 1 is a side view of my invention shown mounted on a trolley wire with the protective cover shown in section.
Figure 3:
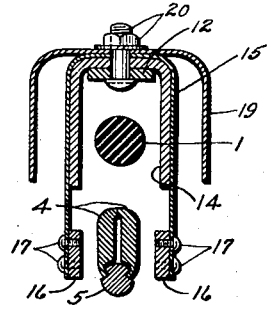
Figure 4:
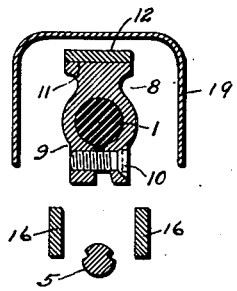
Figure 5:
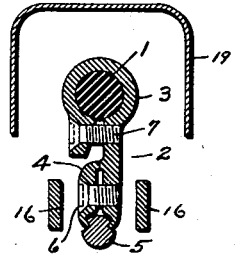

Figs. 3, 4, and 5 are views in transverse section upon the lines 3—3, 4—4, and 5—5 of Fig. 1 respectively.

In the preferred embodiment of my invention I employ a longitudinal member 1 of insulating material such as a fibre impregnated with a synthetic resin, as for instance, paper or canvas impregnated with phenol aldehyde product of condensation, as for instance, Bakelite. I prefer this member 1 of solid material.

Mounted upon the member 1 are supports 2 provided with clamp 3 at one end to receive and grip the member 1 and a clamp 4 at the other end to receive and grip the trolley wire 5. The screws 6 secure the supports 2 to the trolley wire and the screw 7 secures the support to the member 1. With the form of support shown and described, it is unnecessary to in any way weaken the member 1 by drilling or cutting away portions of the member 1.

The support 2 may be used as frequently as necessary depending upon the length of the device, but in ordinary usage a support at each end of the member 1 is usually sufficient.

Mounted upon the member 1 are other supports 8 which have a clamp 9 at one end to receive and grip the member 1 through the medium of the screw 10 and is provided with a flat seat 11 (Fig. 4) at the other end upon which is mounted a metal bar or bracket 12 which may be of steel or other metal, but is preferably copper and is preferably secured permanently to the member 8 by welding as at 13, although these parts may be secured together by the use of screws.

Mounted upon the bar or bracket 12, and adjacent its ends or elsewhere as found convenient, is an inverted U-shaped member 14 which may be of steel.

Mounted upon the U-shaped member 14 is an inverted U-shaped member 15 formed preferably of phosphorus bronze which possesses considerable resiliency or spring action.

Figure 2:
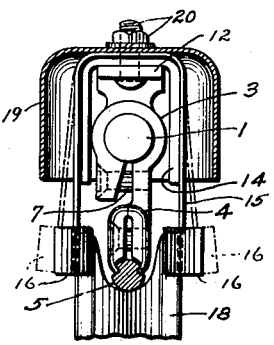
Fig. 2 is an end view of Fig. 1 with the cover shown in section.

Secured to the lower inner faces of the legs of the member 15 by means of screws or rivets 17 are contact bars 16. The bars 16 extend for a considerable length on opposite sides of the trolley wire and are so positioned with respect to the trolley wire that the flanges on a passing current collector 18 will engage the inner faces of the contact bars 16 and thus electrically connect the contact bars 16 with the trolley wire 5 (Fig. 2).

The spread of the legs of the U-shaped member 14 is such that the legs of the U-shaped member 15 will be held in proper spaced relation to the trolley wire.

The only connection between the members 16 and the trolley wire 5 is through the passing current collector 18 since the supports 2 and 8 are insulated from each other.

To protect the insulated member 1 and the insulated supports 2 and 8 from short-circuiting in case of storms, I mount upon the members 15 a cover 19 open only on the bottom and formed preferably of aluminum.

The members 12, 14, 15, and 19 have registered openings through which project the bolts and nuts 20 and 21 which hold these parts together and in case of the bolt 21 provision is made to receive and clamp a conductor or lead from the devices to be operated by the contactor.

The ends of the cover are provided with a transverse shelf-formation 22 which not only strengthens the device but also takes the blow of a flying trolley pole.

In Fig. 2 is shown the manner in which the legs of the member 15 spread due to a passing current collector.

While the member 1 may be of other material than that specifically mentioned, I prefer it to be solid, as tubing is expensive and an attempt to reduce the cost means the tubing is thin which must be reenforced by a metal member therein which eventually means increased weight and no reduction in cost. The members 14 may have the spread of the legs varied by bending to adjust the spread of the members 16. The device is supported by the trolley wire since each end of the device is secured to the trolley wire. If necessary the device may be steadied by guy wires to the member 20.

Modifications will suggest themselves to those skilled in the art from the disclosure I have herein made and, therefore, I wish to be limited only by my claims.

I claim:

1. A trolley contact comprising an elongated rod of insulating material, a support for the rod adjacent each end of the rod and each support provided with means to grip a trolley wire and means to receive and grip the rod, elongated parallel contact members positioned on opposite sides of the first said means and spaced and insulated therefrom to be engaged by a current collector passing between said members, an elongated supporting member positioned above the rod and having downwardly projecting clamps to receive and grip the rod to hold the elongated supporting member fixed relative to the rod, a pair of spaced inverted U-shaped resilient members each with the bight mounted above and supported by the said supporting member while the ends of the downwardly projecting legs of the resilient members are secured to the aforesaid contact members to yieldingly hold the contact members in position to be engaged by the current collector, means supported by the supporting member and interposed between the supporting member and the resilient members to maintain the proper transverse separation of the contact members, a cover open on the bottom mounted above the described parts and means to secure the resilient members and the said interposed means and the cover in position on the supporting member, one of the last said means adapted to receive and grip a conductor whereby the conductor will be electrically connected to the contact members.

2. A trolley contact comprising an elongated rod of insulating material, a plurality of spaced supports for the rod and each support comprising a clamp at one end to receive and grip a trolley wire and another clamp to receive and grip the rod, an elongated metal supporting member mounted above and parallel to the said rod and having depending clamps to receive and grip the rod in spaced relation to the first said supports, a plurality of inverted U-shaped resilient members supported by the metal support member, a plurality of parallel and spaced metal contact bars positioned below the insulating rod and parallel thereto and adapted to be engaged by a current collector passing between the contact bars while simultaneously engaging the trolley wire, the contact bars being yieldingly supported at the ends of the depending legs of the resilient members, means supported by the metal supporting member to maintain proper separation of the contact bars, an open bottom cover for the said parts supported by the said metal supporting member and means to receive and grip a conductor and electrically connect it to the said metal supporting member.

3. In combination, a trolley contact and a trolley wire, the contact comprising a rod formed of insulating material, a pair of longitudinally spaced supports secured to the trolley wire and each support having a clamp to receive and grip the rod and support it above the trolley wire, a second support comprising an elongated bar having means to receive and grip the rod and held thereby above the rod in parallel and vertical alignment with the rod and the trolley wire, a plurality of spaced, elongated contact bars to be engaged and spread temporarily by a passing current collector, resilient means depending from the second support and yieldingly holding the contact bars in properly spaced relation and means to receive and energize a conductor from a device to be operated when the collector engages the contact bars.

4. A trolley contact comprising an elongated insulating member, elongated means positioned above the member and extending longitudinally with respect to the member and supported by the member, resilient means mounted on and depending from the first said means on each side of the said member, elongated spaced contacts, one on each side of and below the said member and attached to the lower ends of the resilient means to be engaged by a passing current collector, supporting means clamped to the insulating member in depending relation thereto and having means to receive and clamp a trolley wire positioned below the said member to support the trolley contact device by and above the trolley wire and means to make electrical connections to the resilient means.

5. A trolley contact comprising an elongated rod of insulating material, a plurality of spaced supports for the rod, each support comprising a pair of jaws at one end to receive and grip a trolley wire and another clamp to receive and grip the rod, an elongated support member mounted above and parallel to the rod and having depending clamps to receive and grip the rod in spaced relation to the first supports, a plurality of depending resilient members supported by the elongated support member, a plurality of parallel and spaced metal contact bars positioned below the insulating rod and parallel thereto and adapted to be engaged by a passing current collector while engaging the trolley wire, the contact bars being yieldingly supported at the lower ends of the depending resilient members, a cover supported by the said support member to protect the parts from leakage, and means to electrically connect a conductor to the resilient members.

6. In combination, a trolley contact comprising an elongated rod of insulating material, a pair of longitudinally spaced supports, a trolley wire secured to the supports to be engaged by a passing current collector, each support having a clamp to receive and grip the rod and support it above the trolley wire, a second support comprising an elongated bar having depending means to receive and grip the rod and hold it in above the rod in parallel relation thereto, the trolley wire and the rod and the said elongated bar positioned in a common vertical plane, a plurality of spaced, elongated contact bars arranged to be engaged by the passing current collector simultaneously with engagement with the trolley wire, resilient means depending from the said bar and yieldingly supporting the contact bars in predetermined spaced relation and means to receive a conductor to be energized when the current collector engages the contact bars.

7. A trolley contact comprising an elongated rod of insulating material, a plurality of spaced supports for the rod, each support comprising means at one end to receive and hold a trolley wire and holding means at the other end to receive and grip the rod, an elongated support member mounted above the rod and having spaced depending means to receive and grip the said rod, the depending means and the holding means being spaced and insulated from each other, a plurality of depending resilient members supported by the elongated support member, a plurality of spaced and parallel metal contact bars positioned below the insulating rod to be engaged by a passing current collector as it engages the trolley wire, the contact bars being attached to and yieldingly supported by the depending resilient members and means to electrically connect a conductor to the elongated support member.

SAMUEL S. MATTHES.